WEIRICH & SMITH.
Gate.
No. 77,142.
Patented April 21, 1868.
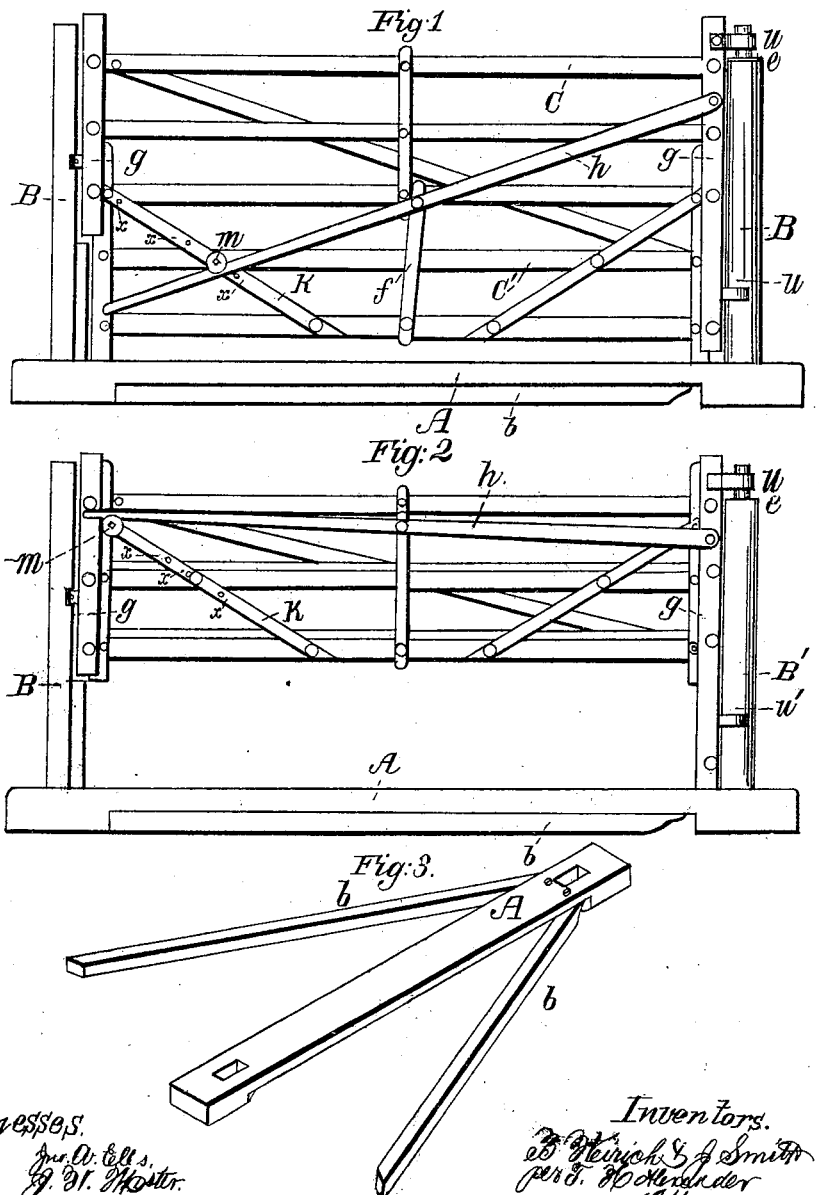

United States Patent Office.

B. WEIRICH AND JOHN SMITH, OF MIDDLEBURY, INDIANA.

Letters Patent No. 77,142, dated April 21, 1868.

IMPROVEMENT IN FARM-GATES.

The Schedule referred to in these Letters Patent and making part of the same.

TO ALL WHOM IT MAY CONCERN:

Be it known that we, B. WEIRICH and JOHN SMITH, of Middlebury, in the county of Elkhart, and State of Indiana, have invented certain new and useful Improvements in Farm-Gates; and we do hereby declare that the following is a full, clear, and exact description thereof, reference being had to the accompanying drawings, and to the letters of reference marked thereon, which form a part of this specification, in which—

Figure 1 is a side elevation, showing the gate in its natural position.

Figure 2, also a side view, showing the bottom section elevated, and

Figure 3 a perspective of the sill, with the swinging bars attached thereto.

The nature of this invention consists in so constructing a farm-gate that it may be adjusted to clear itself of snow or mud; also, in the employment of swinging bars at the bottom of the sill, so arranged as to allow small animals to pass or repass, when desired, without the gate being opened, substantially as hereinafter set forth.

To enable others skilled in the art to make and use our invention, we will now describe its construction and operation.

A represents the sill, which is cut away at its bottom sufficiently to allow small animals to pass under. $b\ b$ are two swinging bars, pivoted beneath the sill, as seen in the drawings. It will be observed that the ends of the bars that swing open are bevelled. So, also, is the step formed at the bottom of the sill. Thus, when the bars are closed, they cannot be pushed open by the smaller animals.

B B' represent the posts, one of which is furnished with a shoulder near its top, upon which shoulder is the metal plate $e$. The object of this plate will be seen presently.

The gate is composed of two sections. Section C is provided with grooved end-pieces, $g\ g'$, in which section C' slides. $h$ represents a lever, pivoted to end-piece $g'$. $f$ is an upright, pivoted at its lower end to the bottom slat of section C', and, at its upper end, in a slot in lever $h$, as seen in figs. 1 and 2. $k$ represents a brace, furnished with holes, $x\ x\ x$, in which is the adjustable pin or button $m$. $u$ represents the upper hinge, and consists only of a band of metal, secured to end-piece $g'$. This hinge rests upon the metal plate $e$. $u'$ is the lower hinge, and is simply a three-quarter-circle band of metal, also secured to end-piece $g'$. The object of this lower hinge is only to keep the gate in position, and not to assist in supporting the weight of it, as the entire weight of the gate is designed to be on the upper hinge. $o$ represents the latch.

The mode of operating our gate is as follows: If found necessary to elevate the lower section, the lever $h$ is raised to any desired height, and retained in position by button $m$.

Having thus fully described our invention, what we desire to secure by Letters Patent, is—

1. The sections C C', lever $h$, and brace $k$, combined and operated as and for the purpose set forth.
2. We claim the swinging bars $b\ b$, sections C C', lever $h$, and brace $k$, all arranged as described.

In testimony that we claim the foregoing as our own, we affix our signature in the presence of two witnesses.

B. WEIRICH,
JOHN SMITH.

Witnesses:
HENRY E. SMITH,
JOEL GILLETT.